United States Patent
Zyuban et al.

(10) Patent No.: US 7,386,851 B1
(45) Date of Patent: Jun. 10, 2008

(54) SYSTEM AND METHOD FOR IMPLEMENTING DYNAMIC LIFETIME RELIABILITY EXTENSION FOR MICROPROCESSOR ARCHITECTURES

(75) Inventors: Victor Zyuban, Yorktown Heights, NY (US); Jeonghee Shin, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/969,413

(22) Filed: Jan. 4, 2008

(51) Int. Cl.
*G06F 9/46* (2006.01)
*G06F 15/173* (2006.01)
*G06F 11/00* (2006.01)
*G06F 1/00* (2006.01)
*G06F 1/26* (2006.01)
*G11C 29/00* (2006.01)

(52) U.S. Cl. ............ 718/104; 718/105; 709/223; 709/224; 714/13; 714/710; 714/763; 713/300; 713/320

(58) Field of Classification Search ....... 718/100–108; 709/201, 223–224; 714/13, 710, 763; 713/300, 713/320
See application file for complete search history.

(56) References Cited

U.S. PATENT DOCUMENTS

| | | | |
|---|---|---|---|
| 4,590,554 A * | 5/1986 | Glazer et al. ............ | 714/13 |
| 6,088,328 A * | 7/2000 | McKnight ............... | 370/216 |
| 6,308,286 B1 * | 10/2001 | Richmond et al. ......... | 714/13 |
| 6,651,082 B1 * | 11/2003 | Kawase et al. ........... | 718/105 |
| 6,865,591 B1 * | 3/2005 | Garg et al. .............. | 709/201 |
| 6,907,607 B1 * | 6/2005 | Mummert et al. ........ | 718/104 |
| 6,931,567 B2 * | 8/2005 | Tanaka et al. ........... | 714/6 |
| 6,973,604 B2 * | 12/2005 | Davis et al. ............ | 714/710 |
| 6,996,728 B2 * | 2/2006 | Singh ................... | 713/300 |
| 7,069,558 B1 * | 6/2006 | Stone et al. ............ | 718/104 |
| 7,100,060 B2 | 8/2006 | Cai et al. | |
| 7,222,245 B2 * | 5/2007 | Singh ................... | 713/300 |
| 2003/0172329 A1 * | 9/2003 | Davis et al. ........... | 714/710 |
| 2003/0204758 A1 * | 10/2003 | Singh ................... | 713/320 |

(Continued)

OTHER PUBLICATIONS

Rosing et al., "Power and Reliability Management of SOCs", IEEE, Apr. 2007, pp. 391-403.*
Khan et al., "Bulk Load Points Reliability Evaluation Using a Security Based Model", IEEE, May 1998, pp. 456-463.*

(Continued)

*Primary Examiner*—Lewis A. Bullock, Jr.
*Assistant Examiner*—Jennifer N To
(74) *Attorney, Agent, or Firm*—Cantor Colburn LLP; Lisa Yamonaco

(57) ABSTRACT

A system for implementing dynamic lifetime reliability extension for microprocessor architectures having a plurality of primary resources and a secondary resource pool of one or more secondary resources includes a resource operational mode controller configured to selectively switch of the primary and secondary resources between an operational mode and a non-operational mode, wherein the non-operational mode corresponds to a lifetime extension process; a resource mapper associated with the secondary resource pool and in communication with the resource operational mode controller, configured to map a secondary resource placed into the operational mode to a corresponding primary resource placed into the non-operational mode; and a transaction decoder configured to receive incoming transaction requests and direct the requests to one of a primary resource in the operational mode and a secondary resource in the operational mode, the secondary resource mapped to an associated primary resource placed in the non-operational mode.

5 Claims, 3 Drawing Sheets

U.S. PATENT DOCUMENTS

2003/0204759 A1* 10/2003 Singh .......................... 713/320
2007/0016663 A1* 1/2007 Weis ........................... 709/223
2007/0033491 A1* 2/2007 Howlett ....................... 714/763
2007/0101203 A1 5/2007 Pomaranski et al.
2007/0271369 A1* 11/2007 Aydin et al. ................. 709/224

OTHER PUBLICATIONS

Naser, "Evaluating the Effects of Aging on Electronic Instrument and Control Circuit Boards and Components in Nuclear Power Plans", Technical Report, US Department of Energy, May 2005, pp. 1-110.*

* cited by examiner

SYSTEM AND METHOD FOR IMPLEMENTING DYNAMIC LIFETIME RELIABILITY EXTENSION FOR MICROPROCESSOR ARCHITECTURES

BACKGROUND

The present invention relates generally to improvements in lifetime reliability of semiconductor devices and, more particularly, to a system and method for implementing dynamic lifetime reliability extension for microprocessor architectures.

Lifetime reliability has become one of the major concerns in microprocessor architectures implemented with deep submicron technologies. In particular, extreme scaling resulting in atomic-range dimensions, inter and intra-device variability, and escalating power densities have all contributed to this concern. At the device and circuit levels, many reliability models have been proposed and empirically validated by academia and industry. As such, the basic mechanisms of failures at a low level have been fairly well understood, and thus the models at that level have gained widespread acceptance. In particular, work lifetime reliability models for use with single-core architecture-level, cycle-accurate simulators have been introduced. Such models have focused on certain major failure mechanisms including, for example, electromigration (EM), negative bias temperature instability (NBTI), positive bias temperature instability (PBTI), and time dependent dielectric breakdown (TDDB).

With respect to improving lifetime reliability of semiconductor devices, existing efforts may be grouped into three general categories: sparing techniques, graceful degradation techniques, and voltage/frequency scaling techniques. In sparing techniques, spare resources are designed for one or more primary resources and deactivated at system deployment. When primary resources fail later during system lifetime, the spare resources are then activated and replace the failed resources in order to extend system lifetime. The sparing techniques cause less performance degradation due to failed resources. However, high area overhead of spare resources is a primary drawback of this approach.

In graceful degradation techniques, spare resources are not essential in order to extend system lifetime. Instead, when resource failing occurs, systems are reconfigured in such a way so as to isolate the failed resources from the systems and continue to be functional. As a result, graceful degradation techniques save overhead cost for spare resources, however system performance degrades throughout lifetime. Accordingly, graceful degradation techniques are limited to applications and business where the degradation of performance over time is acceptable, which unfortunately excludes most of the high-end computing.

Thirdly, voltage/frequency scaling techniques are often used for power and temperature reduction and are thus proposed for lifetime extension. The system lifetime is predicted based on applied workloads and the voltage/frequency of the systems is scaled with respect to lifetime prediction. While voltage/frequency scaling techniques enable aging of systems to be slowed down as needed, these techniques also result in performance degradation of the significant parts of the system or the entire systems. In addition, although reduced voltage/frequency diminishes the degree of stress conditions, these techniques are unable to actually remove stress conditions of aging mechanisms from semiconductor devices.

Still another existing technique, directed to reducing the leakage power during inactive intervals, is to use so-called "sleep" or "power down" modes for logic devices that are complemented with transistors that serve as a footer or a header to cut leakage during the quiescence intervals. During a normal operation mode, the circuits achieve high performance, resulting from the use of faster transistors which typically have higher leakage. The headers and/or footers are activated so as to couple the circuits to $V_{dd}$ and/or ground (more generally logic high and low voltage supply rails). In contrast, during the sleep mode, the high threshold footer or header transistors are deactivated to cut off leakage paths, thereby reducing the leakage currents by orders of magnitude. This technique, also known as "power gating," has been successfully used in embedded devices, such as systems on a chip (SOC). However, although power gating diminishes current flow and electric field across semiconductor devices (which results in a certain degree of stress reduction and increase in the lifetime of devices), it is unable to completely eliminate such stress conditions and/or stimulate the recovery effects of aging mechanisms.

SUMMARY

The foregoing discussed drawbacks and deficiencies of the prior art are overcome or alleviated, in an exemplary embodiment, by a system for implementing dynamic lifetime reliability extension for microprocessor architectures, the system including a plurality of primary resources; a secondary resource pool having one or more secondary resources; a resource operational mode controller configured to selectively switch each of the primary and secondary resources between an operational mode and a non-operational mode, wherein the operational mode corresponds to performance of one or more tasks for which a given resource is designed to execute with respect to a microprocessor system and wherein the non-operational mode corresponds to a temporary lifetime extension process for at least one of suspending the aging of resources and reversing the aging of resources; a resource mapper associated with the secondary resource pool and in communication with the resource operational mode controller, the resource mapper configured to map a secondary resource placed into the operational mode to a corresponding primary resource placed into the non-operational mode, and to un-map a secondary resource from a corresponding primary resource in the event the corresponding primary resource is placed back into the operational mode; and a transaction decoder configured to receive incoming transaction requests and, responsive to the resource operational mode controller, direct the requests to one of a primary resource in the operational mode and a secondary resource in the operational mode, the secondary resource mapped to an associated primary resource placed in the non-operational mode.

BRIEF DESCRIPTION OF THE DRAWINGS

Referring to the exemplary drawings wherein like elements are numbered alike in the several Figures.

DETAILED DESCRIPTION

Figure 1:
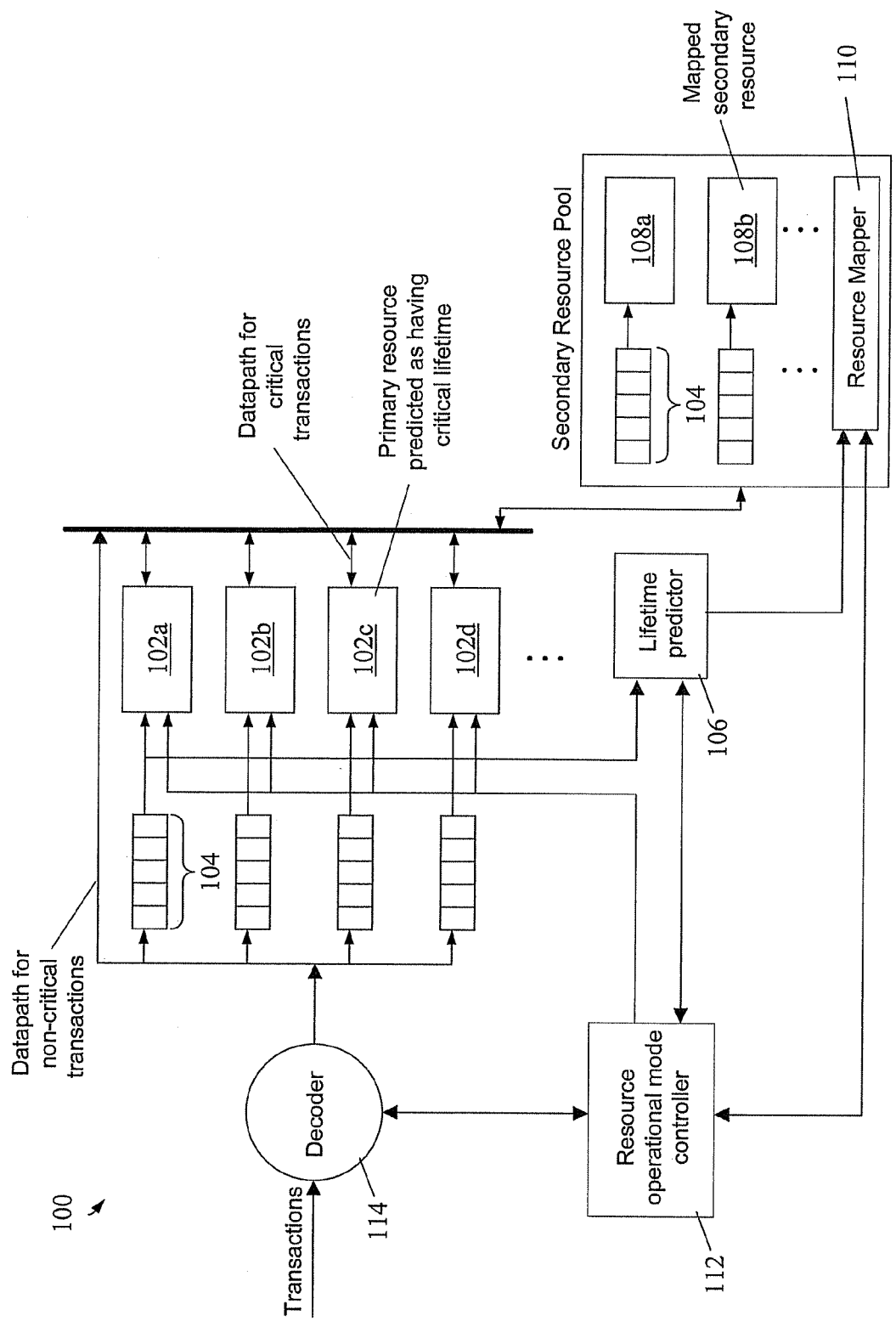
FIG. 1 is a schematic block diagram of a system for implementing dynamic lifetime reliability extension for microprocessor architectures, in accordance with an embodiment of the invention.

Disclosed herein is a system and method for implementing dynamic lifetime reliability extension for microprocessor architectures, wherein various microprocessor components and circuits are selectively placed in "non-operational" modes. Such non-operational modes may include, for example, special lifetime extension methods for suspending and/or reversing the aging of resources. That is, rather than using the resources for their intended purpose, components (e.g., transistors) of such resources are temporarily subjected to a process in which stress conditions of aging mechanisms, such as electromigration, negative bias temperature instability (NBTI), positive bias temperature instability (PBTI), and time dependent dielectric breakdown (TDDB), are removed and/or reversed with respect to the semiconductor devices comprising the resources. In contrast, an "operational mode" as used herein generally refers to a task or tasks for which a microprocessor component is designed to execute with respect to a microprocessor system. Additional information regarding aging mechanism removal (termed "wearout gating") and aging mechanism reversal (termed "intense recovery") may be found in co-pending application Ser. Nos. 11/928,232 and 11/928,205, respectively, both filed on Oct. 30, 2007, assigned to the assignee of the present application, and the contents of which are incorporated herein by reference.

In addition to lifetime extension, the overall system performance during a lifetime extension non-operational mode (such as described above) for one or more components can also be improved by having spare resources take over the responsibility of the resources placed in the non-operational modes. As used herein, "original" resources are also referred to as "primary" resources and those resources replacing primary resources in non-operational modes are also referred to as "secondary" resources. The secondary resources are dismissed from replacement duty when the primary resources mapped thereto are placed back in a normal operational mode. Further, the secondary resources may themselves enter a non-operational mode (e.g., wearout gating, intense recovery) until such time as they are needed once again to replace the same or different primary resources. The secondary resources may be statically allocated to corresponding primary resources by design or, alternatively, be shared by more than one primary resource. In the latter case, shared secondary resources logically create a pool, also referred to herein as a "secondary resource pool," but are not necessarily physically located together. Also, the secondary resources in the pool are optionally reconfigurable or micro-code programmable for one or more functions.

For further performance improvement, the disclosed embodiments herein also enable transactions along "critical paths" (in terms of performance) to be executed on primary resources by interrupting a non-operational mode of the primary resource if needed. Such an interruption of a non-operational, lifetime extension mode may occur whenever critical transactions are detected or predicted, or when overall system performance degradation exceeds a predefined threshold performance. With respect to "critical transactions," the additional execution latency of instructions behind load instructions stalled due to a cache miss has little affect the overall performance. On the other hand, load instructions incurring a cache miss (leading to a mispredicted branch, or slowing down the issue rate while waiting for data to arrive) are along the critical path of performance. In one exemplary embodiment, the criticality of transactions may be predicted in accordance with known techniques, such as based on their history or may be detected by known techniques, such as by using a data dependence graph or a heuristic approach.

Referring now to FIG. 1, there is shown a schematic block diagram of a system 100 for implementing dynamic lifetime reliability extension for microprocessor architectures (while also alleviating performance degradation), in accordance with an embodiment of the invention. As shown, the system 100 includes among other aspects, a plurality of primary resources 102a, 102b, 102c, etc., (depicted with transaction queues 104 associated therewith), lifetime predictor 106, a secondary resource pool having one or more secondary resources 108a, 108b, etc., (also depicted with transaction queues 104 associated therewith), a resource mapper 110 associated with the secondary resource pool for tracking the mapping of secondary resources 108 to primary resources 102 in non-operational modes, a resource operational mode controller 112, and a transaction decoder 114.

The lifetime predictor 106 monitors access patterns (such as events and states, for example) of primary resources 102 and predicts their remaining lifetime. It is contemplated that any suitable methodologies for lifetime prediction may be used in the system 100 such as, for example, those disclosed in U.S. Patent Application Publication Nos. 20050257078 and 20060080062, and in U.S. application Ser. No. 11/735,533 filed Apr. 16, 2007, each assigned to the assignee of the present application and the contents of which are incorporated by reference herein in their entirety. In the event that any of the primary resources 102 are predicted as having a lifetime shorter than a defined threshold lifetime, the lifetime predictor 106 alerts the resource operational mode controller 112 and resource mapper 110 so that the identified primary resource(s) may be placed in a non-operational mode (e.g., wearout gating, intense recovery, etc.).

In particular, the resource mapper 110 is responsible for finding and allocating available secondary resources in the pool upon request, and to map the allocated secondary resource (e.g., secondary resource 108b) to the identified primary resource for lifetime extension treatment (e.g., primary resource 102c) such that decoded transactions from the decoder 114 originally intended for the identified primary resource are thereafter executed by the allocated secondary resource. If there is more than one available secondary resource found in the pool, the mapper 110 may select a secondary resource based on one or more of: round-robin order, remaining lifetime order of the secondary resources themselves, and maximum recovery based order. On the other hand, if there is no available secondary resource found, the resource mapper 110 may either reject the request or commandeer a secondary resource already mapped to another primary resource.

In the former case, the resource mapper 110 sends a rejection message to the requester (e.g., through the resource operational mode controller 112), optionally with a ticket number for retry. In addition, the resource mapper 110 may optionally include a reservation table to keep record of rejected requests and, if any secondary resource subsequently becomes free, the resource mapper 110 allocates it to one of pending requests in the reservation table. In the latter case, the resource mapper keeps information of the priority of primary resources mapped to secondary resources in the pool in a certain order, such as by remaining lifetime or by maximum recovery, for example.

In addition, the resource mapper 110 is further configured to evaluate the priority of a new request. For example, if lower priority primary resources (with respect to the requesting primary resource) are found, then the resource mapper 110 de-allocates the secondary resource mapped to the primary resource having the lowest priority and also notifies the resource operational mode controller 112 to interrupt the non-operational mode for that lowest priority primary resource. Once the non-operational mode for the lowest priority primary resource has been interrupted, the resource mapper 110 then maps the commandeered secondary resource to the higher priority requesting primary resource and notifies the resource operational mode controller 112 of the new request so as to commence placement of the higher priority requesting primary resource into the non-operational mode for lifetime extension treatment.

Conversely, if lower priority primary resources (with respect to the requesting primary resource) are not found, the resource mapper 110 sends a rejection to the requester and optionally adds the request to a reservation table as described above. The resource operational mode controller 112, as indicated, controls whether the primary/secondary resources are in an operational or a non-operational mode. The controller 112 is also responsible for ensuring that primary resource states are safely migrated or stored before switching from operational to non-operational if needed, and that secondary resource states are safely migrated or stored before switching from non-operational to operational if needed. Further, the controller 112 directs the decoder 114 to communicate transactions to either primary resources in an operational mode or to secondary resources that are mapped to primary resources in a non-operational mode.

In an exemplary embodiment, the resource operational mode controller 112 places a primary resource in a non-operational mode upon receiving notification from the resource mapper 110 that a secondary resource has been mapped to the primary resource, resulting from one or more of: a request from the lifetime predictor 106 upon a determination that the predicted remaining lifetime of the primary resource is shorter than a defined threshold; a notification from the decoder when the primary resource is predicted as idle, not anticipating critical transactions, or not causing performance degradation that exceeds a threshold for sufficient amount of time; and a determination by the resource mapper 110 of regularly scheduled lifetime extension for primary resources.

Further, the resource operational mode controller 112 interrupts or terminates a non-operational mode in one or more cases of: when the scheduled time for lifetime extension techniques in the non-operational mode is up; when transactions along critical paths are detected or performance degradation exceeds a threshold; when the resource mapper 110 requests the termination of the non-operational mode in order to allocate the secondary resource to another primary resource or to have the secondary resource enter the non-operational mode.

Figure 2:
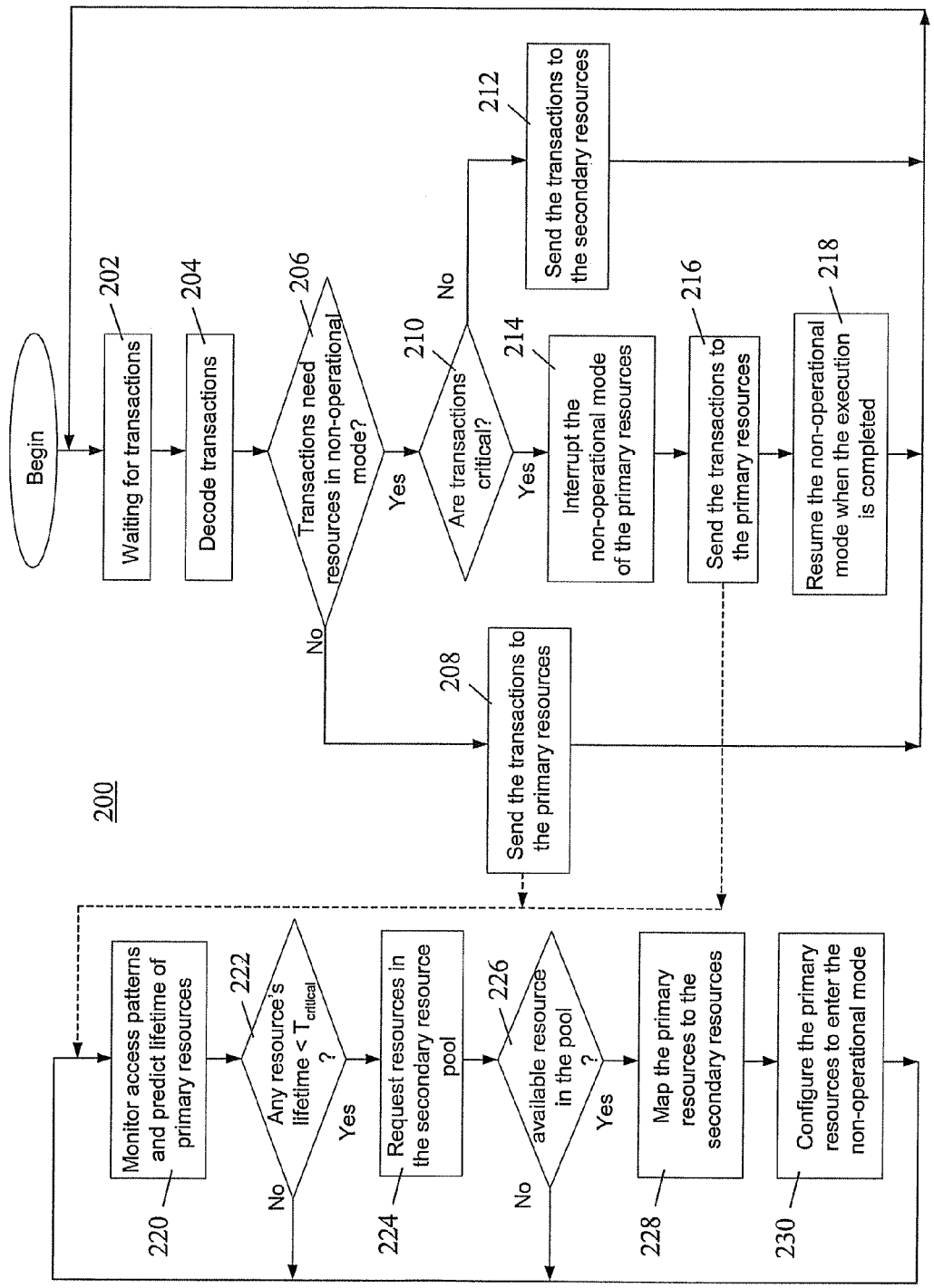
FIG. 2 is a flow diagram illustrating an exemplary method of implementing dynamic lifetime reliability extension for microprocessor architectures, as executed by the system of FIG. 1.

Referring now to FIG. 2, there is shown a flow diagram illustrating an exemplary method 200 of implementing dynamic lifetime reliability extension for microprocessor architectures (while alleviating performance degradation), as may be executed by the system of FIG. 1.

Beginning in block 202, the decoder(s) (e.g., decoder 114 of FIG. 1) await requested transactions, and then decodes the transactions in block 204 to determine what primary resources are needed to execute the transactions, as well as whether or not such transactions are along the critical path in terms of system performance. At decision block 206, it is then determined whether the primary resources needed to execute the requested transactions are presently in a non-operational mode (e.g., wearout gating, intense recovery, etc. for lifetime extension). If they are not (i.e., they are in an operational mode), the method proceeds to block 208 where the transactions are sent to (and executed by) the primary resources. In this case, the method then simply loops back to block 202 to await additionally requested transactions.

However, if at decision block 206 it is determined that the primary resources needed to execute the requested transactions are presently in a non-operational mode are in fact presently in a non-operational mode, a further inquiry is made in decision block 210 as to whether the requested transactions are critical. If the transactions are not critical, then the transactions are sent to (and executed by) the secondary resources as indicated in block 212. The method then loops back to block 202 to await additionally requested transactions.

Conversely, if it is determined at decision block 210 that the transactions are critical, then the method proceed to block 214 where the non-operational mode of the primary resources is interrupted. Then, in block 216, the transactions are sent to (and executed by) the primary resources. Once the transactions are completed, the non-operational mode may be resumed for the primary resources as shown in block 218, after which method loops back to block 202 to await additionally requested transactions. Alternatively, the criticality determination at block 210 may optionally be omitted such that the non-operational mode of primary resources is automatically interrupted for requested transactions, regardless of whether they are critical or not.

As will be further noted from FIG. 2, as transactions are sent to and executed by primary resources, the dashed lines associated with block 208 and 210 are directed to another (optional) aspect of the exemplary method 200, in which the lifetime of primary resources is dynamically predicted (e.g., by lifetime predictor 106 of FIG. 1). In this portion of method 200, as primary resources are accessed and used, such access patterns are monitored and used to predict the remaining lifetime of the primary resources, as shown in block 220. At decision block 222, it is determined whether the predicted remaining lifetime of any of the primary resources has fallen below a defined threshold ($T_{critical}$). If not, no action need be taken and this portion of the process returns to block 200 to continue to monitor access patterns and predict lifetime of primary resources.

However, if any of the primary resources have in fact fallen below the defined remaining lifetime threshold, the lifetime predictor 106 (FIG. 1) sends a request for secondary resources to the resource mapper 110 (FIG. 1) as shown in block 224. Then, as shown in decision block 226, it is determined (by the resource mapper) whether there are any available resources in the secondary resource pool to accommodate the request of block 224. In the event that all resources in the pool are busy and no other resources are preempted for the requests, the resource mapper sends a rejection to the requesters, along with a recommended retry time. The process then continues to monitor access patterns and predict resource lifetimes in block 220. Optionally, the mapper has a reservation table to keep record of rejected requests and, if any secondary resource becomes available, the mapper allocates it to one of the pending requests in the table. In addition to lifetime predictors, the resource operational mode controller is optionally able to request secondary resources to further extend lifetime of primary resources.

However, if there are available resources in the pool as reflected in decision block 226, the resource mapper allocates the available resources to the requested primary resources in block 228, updates a resource mapping table accordingly and notifies the resource operational mode controller to place the aging resource in a non-operational mode. In block 230, the resource operational mode controller configures the corresponding primary resource from the operational mode to the non-operational mode. In switching from the operational mode to the non-operational mode, the controller resource operational mode further ensures that the states of the primary resources are safely stored or migrated to the secondary resources mapped in the pool if needed, thus avoiding adverse effects on system integrity.

Although the system and method embodiments described above are discussed in general terms such as primary and secondary resources within an microprocessor system, such resources may represent any of a number of components associated with a microprocessor system including, but not limited to: static random access memory (SRAM) arrays, embedded dynamic random access memory (EDRAM) arrays, register files, execution units, and processor cores, for example.

Figure 3:
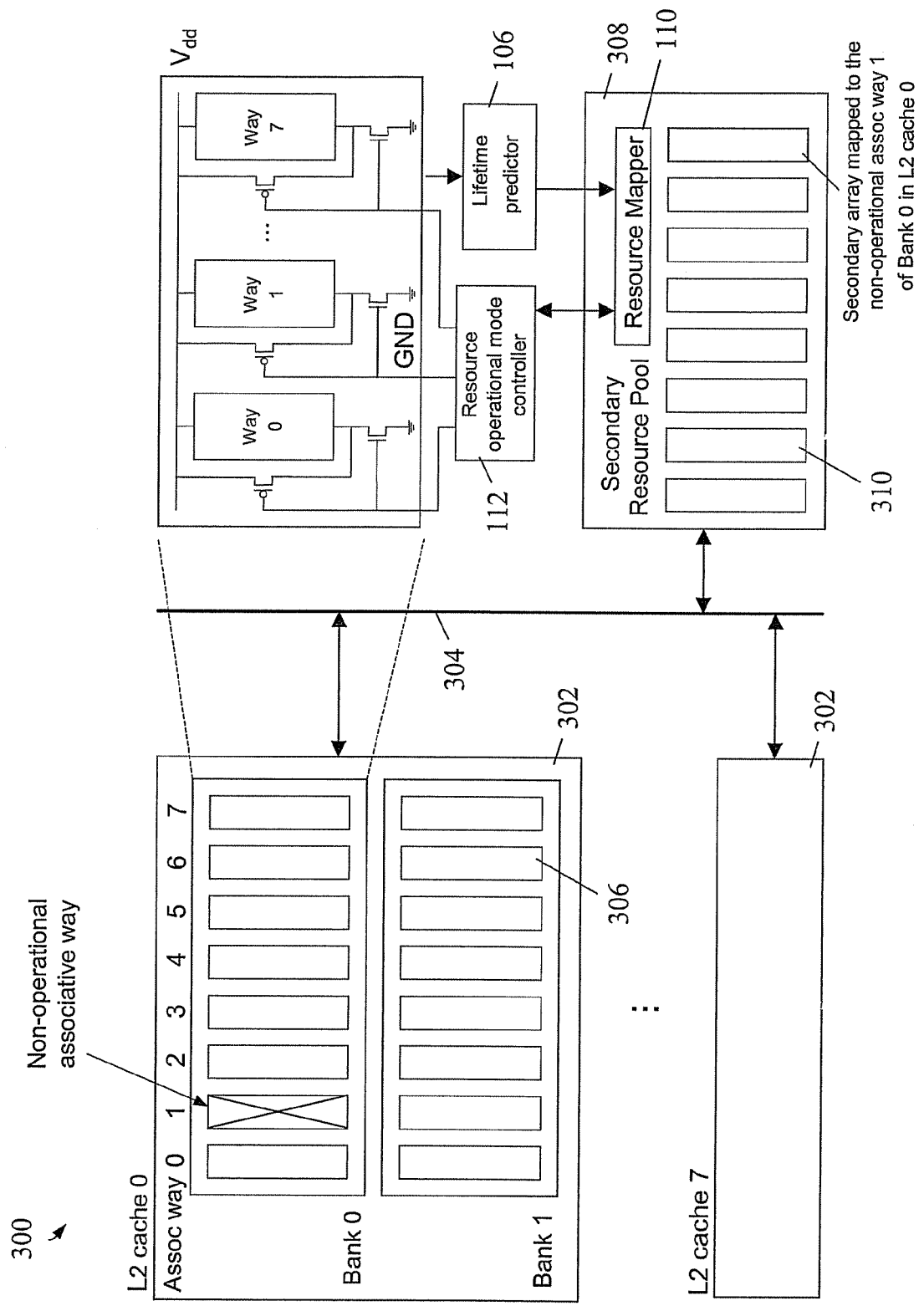
FIG. 3 is a schematic block diagram illustrating a specific example of an application of the system and method of FIGS. 1 and 2 as applied to L2 caches in multiple on-chip processor core systems.

Accordingly, FIG. 3 a schematic block diagram illustrating a specific example of an application of the system and method of FIGS. 1 and 2, as applied to L2 caches in multiple on-chip processor core systems. As shown in FIG. 3, the system 300 includes are eight on-chip L2 caches 302 (cache 0 through cache 7) connected through a common bus 304, wherein each cache 302 may be private with respect to one on-chip processor core or, alternatively, shared by more than one on-chip processor core. As shown in the exemplary embodiment of FIG. 3, each L2 cache 302 further includes two banks (Bank 0, Bank 1) and has 8-way set associativity.

The dynamic lifetime reliability extension techniques described above is capable of being applied to various granularities of L2 caches for the non-operational mode, such as to the entire cache, banks, arrays, columns and rows. In the exemplary L2 cache system 300 in FIG. 3, eight associative ways may each enter a non-operational mode independently with respect one another. Each associative way is implemented as one or more memory arrays 306. In addition, each L2 cache 302 has a resource operational mode controller 112 and a lifetime predictor 106 associated therewith. The secondary resource pool 308 includes a plurality of secondary arrays 310 and a resource mapper(s) 110. As described above, these secondary arrays 310 in the secondary resource pool 308 may be physically located together and/or distributed across the chip. The resource mapper(s) 110 is also centralized or distributed or both, along with secondary arrays.

In one specific operational example, it is assumed that the primary array(s) for way 1 of bank 0 in L2 cache 0 (also marked with an "X" in FIG. 3) is requested to be placed in the non-operational mode. The secondary resource mapper 110 checks to see whether there are any available secondary arrays 310 in the pool 308. If any are available, the mapper 110 allocates one of the available secondary arrays 310 to the requested primary array (in this example, to way 1 of bank 0 in L2 cache 0) and updates the resource mapping table in such a way so as to respond bus transactions associated with L2 cache 0 and the address range of the primary array. The selected secondary array enters the operational mode if it has been in the non-operational mode.

If no available secondary array 310 presently exists in the pool, the mapper 110 rejects the request with a retry time or adds the rejected request to the reservation table. The term "available" in this example refers to those secondary arrays that are either free and have a remaining lifetime longer than the threshold lifetime, or those secondary arrays that are already mapped to other primary arrays having a longer remaining lifetime than the array for way 1.

If the resource operational mode controller 112 receives a mapping confirmation from the secondary resource mapper 308, the controller 112 commences a drain process of cache lines in the array of way 1. However, if the secondary array request is rejected, the resource operational mode controller 112 retries after the recommended retry time. In the drain process, cache lines in the dirty or exclusive state are written back to main memory and L1 cache lines associated to the cache lines are invalidated. Alternatively, in the drain process, valid cache lines are migrated to the mapped secondary array, optionally through dedicated interconnects.

When the drain process is completed, the resource operational mode controller 112 configures the array of way 1 to enter the non-operational mode. In addition, the resource operational mode controller 112 configures the L2 cache controller (not specifically shown) in such a way so as to send accesses of cache lines in the array of way 1 to the secondary resource pool 310. Thus, when processor cores request reads hitting in the L2 cache, the cache controller sends the cache line to the processor cores. If reads hit in the secondary array, the controller issues a bus transaction which is responded to by the secondary array. When read requests miss in the L2 cache including the secondary array, the controller issues a cache miss request on the bus 304, which is in turn responded to by other L2 caches, L3 caches or memory.

When processor cores request writes hitting in the L2 cache, the cache controller updates the cache line. If writes hit in the secondary array, the cache controller sends the data to the secondary array for writes. When writes miss in the L2 cache including the secondary subarray, the controller issues a cache miss for writes on bus. When other L2 caches issue a cache miss for reads on the bus 304, the cache controller snoops the miss. If the controller has to provide data to the requester, it reads the cache and sends data on bus, or lets the secondary arrays provide data to the requester. When other L2 caches issue a cache miss for writes on the bus 304, the cache controller snoops the miss and invalidates the cache line if necessary. Since invalidation requires only a change of cache line state, the secondary array does nothing even if it has the cache line for invalidation.

The non-operational mode of the array of way 1 is terminated by the resource operational mode controller 112 in the event the cache miss rate or cache access time exceeds the threshold, or by the secondary resource mapper 110 in the event the non-operational time is up or the secondary array needs to be either allocated to another primary array or itself enter the non-operational mode.

The resource operational mode controller 112 configures the primary array of way 1 to enter the operational mode and begins a drain process of cache lines in the secondary array mapped to way 1. In the drain process, cache lines in the dirty or exclusive state are written back to main memory (or to the next level of the memory cache hierarchy) and the corresponding L1 cache lines are invalidated. Alternatively, in the drain process, valid cache lines are migrated to the primary array of way 1, optionally through dedicated interconnects. Finally, once the drain process is completed, the resource operational mode controller 112 notifies the secondary resource mapper 110 to un-map the secondary array. The unmapped secondary array either enters the non-operational mode or is allocated to another array that caused the termination or another array having the highest priority in the reservation table.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system executing on a microprocessor architectures for implementing dynamic lifetime reliability extension of said microprocessor architectures, the system comprising:
    a plurality of primary resources;
    a secondary resource pool having one or more secondary resources;
    a resource operational mode controller configured to selectively switch each of the primary and secondary resources between an operational mode and a non-operational mode, wherein the operational mode corresponds to performance of one or more tasks for which a given resource is designed to execute with respect to a microprocessor system and wherein the non-operational mode corresponds to a temporary lifetime extension process for at least one of suspending the aging of resources and extending the aging of resources;
    a resource mapper associated with the secondary resource pool and in communication with the resource operational mode controller, the resource mapper configured to map a secondary resource placed into the operational mode to a corresponding primary resource placed into the non-operational mode, and to un-map a secondary resource from a corresponding primary resource in the event the corresponding primary resource is placed back into the operational mode; and
    a transaction decoder configured to receive incoming transaction requests and, responsive to the resource operational mode controller, direct the requests to one of a primary resource in the operational mode and a secondary resource in the operational mode, the secondary resource mapped to an associated primary resource placed in the non-operational mode.

2. The system of claim 1, further comprising:
    a lifetime predictor configured to monitor usage of the primary resources, wherein the lifetime predictor predicts a remaining lifetime thereof;
    wherein, in the event that any of the primary resources are predicted as having a lifetime shorter than a defined threshold lifetime, the lifetime predictor alerts the resource operational mode controller and resource mapper so that an identified primary resource designated to be placed in the non-operational mode.

3. The system of claim 1, wherein the resource mapper is configured to:
    find and allocate available secondary resources in the pool upon a request, and to map an allocated secondary resource to a corresponding one of the identified primary resources that is designated for lifetime extension treatment, such that decoded transactions by the decoder originally intended for the identified primary resource are thereafter executed by the allocated secondary resource;
    wherein, in the event that there is more than one available secondary resource found in the pool, the resource mapper select a secondary resource based on one or more of: a round-robin order, a remaining lifetime order of the secondary resources themselves, and a maximum recovery based order; and
    in the event there is no available secondary resource found, the resource mapper is further configured to implement one of: rejecting the request, and commandeering a secondary resource already mapped to another primary resource.

4. The system of claim 3, wherein the resource mapper is further configured to:
    evaluate a priority of a new request with respect to lifetime extension treatment;
    de-allocate a secondary resource mapped to a primary resource of lower priority in favor of another primary resource of higher priority;
    notify the resource operational mode controller to interrupt the non-operational mode for the lower priority primary resource;
    map the de-allocated secondary resource to the other primary resource of higher priority and notify the resource operational mode controller of the new request so as to result in the placement of the higher priority primary resource into the non-operational mode for lifetime extension treatment; and
    in the event a lower priority primary resource with respect to the request is not found, the resource mapper is further configured to implement one or more of: sending a rejection of lifetime extension treatment for the new request, and adding the request to a reservation table.

5. The system of claim 1, wherein the primary and secondary resources comprise one or more of: static random access memory (SRAM) arrays, embedded dynamic random access memory (EDRAM) arrays, register files, execution units, and processor cores.

* * * * *